United States Patent
White

(10) Patent No.: US 9,784,286 B2
(45) Date of Patent: Oct. 10, 2017

(54) FLUTTER-RESISTANT TURBOMACHINERY BLADES

(71) Applicant: HONEYWELL INTERNATIONAL INC., Morristown, NJ (US)

(72) Inventor: Cristina White, Phoenix, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 633 days.

(21) Appl. No.: 14/181,098

(22) Filed: Feb. 14, 2014

(65) Prior Publication Data

US 2015/0233390 A1    Aug. 20, 2015

(51) Int. Cl.
| F04D 29/66 | (2006.01) |
| F04D 29/32 | (2006.01) |
| F04D 19/00 | (2006.01) |
| B23P 15/02 | (2006.01) |

(52) U.S. Cl.
CPC .......... *F04D 29/668* (2013.01); *B23P 15/02* (2013.01); *F04D 19/002* (2013.01); *F04D 29/328* (2013.01); *Y10T 29/49336* (2015.01)

(58) Field of Classification Search
CPC .... F04D 29/668; F04D 19/002; F04D 29/328; F04D 29/324; F04D 29/325; F04D 29/384; F05B 2240/30; F05B 2240/301; F05B 2260/964; B23P 15/02; Y10T 29/49336

See application file for complete search history.

(56) References Cited

U.S. PATENT DOCUMENTS

| 3,333,817 A | | 8/1967 | Rhomberg | |
| 3,697,193 A | * | 10/1972 | Phillips | B64C 3/14 416/223 R |
| 4,285,636 A | * | 8/1981 | Kato | F01D 5/141 416/119 |
| 4,798,519 A | * | 1/1989 | Zipps | F01D 5/22 416/190 |

(Continued)

FOREIGN PATENT DOCUMENTS

EP    2333242 A2    6/2011

OTHER PUBLICATIONS

EP Extended Search Report for Application No. EP15153376.7, dated Jun. 24, 2015.

(Continued)

*Primary Examiner* — Sarang Afzali
(74) *Attorney, Agent, or Firm* — Lorenz & Kopf, LLP

(57) ABSTRACT

Flutter-resistant transonic turbomachinery blades and methods for reducing transonic turbomachinery blade flutter are provided. The flutter-resistant transonic turbomachinery blade comprises a transonic turbomachinery blade that includes opposite pressure and suction surfaces extending longitudinally in span from a root to an opposite tip, and extending axially in chord between opposite leading and trailing edges. The flutter-resistant transonic turbomachinery blade includes a local positive camber in or proximate a predicted local region of supersonic flow over the transonic turbomachinery blade. The method comprises predicting a local region of supersonic flow over the transonic turbomachinery blade and inducing the local positive camber to the transonic turbomachinery blade in or proximate the predicted region of supersonic flow.

13 Claims, 10 Drawing Sheets

(56) References Cited

U.S. PATENT DOCUMENTS

| | | | |
|---|---|---|---|
| 4,844,698 A | 7/1989 | Gornstein et al. | |
| 4,946,348 A | 8/1990 | Yapp | |
| 6,059,532 A | 5/2000 | Chen et al. | |
| 6,328,533 B1 * | 12/2001 | Decker | F01D 5/141 416/223 A |
| 7,374,403 B2 * | 5/2008 | Decker | F01D 5/141 416/223 A |
| 7,597,544 B2 * | 10/2009 | Hasenjager | F01D 5/141 416/242 |
| 9,046,111 B2 * | 6/2015 | Harvey | F04D 29/324 |
| 2007/0243068 A1 | 10/2007 | Wadia et al. | |

OTHER PUBLICATIONS

EP Examination Report for Application No. 15153376.7-1610 dated Feb. 21, 2017.

* cited by examiner

FLUTTER-RESISTANT TURBOMACHINERY BLADES

TECHNICAL FIELD

The present invention generally relates to turbomachinery, and more particularly relates to flutter-resistant transonic turbomachinery blades and methods for reducing transonic turbomachinery blade flutter.

BACKGROUND

Turbomachines operate by exchanging energy with a working fluid using alternating rows of rotating blades (hereinafter "turbomachinery blades") and non-rotating vanes. Each turbomachinery blade interacts with the working fluid. Turbomachinery blades may be attached to and secured in a circumferential blade array to a rotor disk or other similar component of a gas turbine engine, or fan or compressor of a turbomachine.

It is known that turbomachinery blades (e.g., fan blades, propeller blades, compressor blades, turbine blades, etc.) are subject to destructive vibrations due to unsteady interaction of the blades with the working fluid. One type of vibration is known as flutter, which is aero-elastic instability resulting from the interaction of the flow of the working fluid over the blades and the blades' natural vibration tendencies. When flutter occurs, the unsteady aerodynamic forces on the blade, due to its vibration, add energy to the vibration, causing the vibration amplitude to increase. The vibration amplitude can become large enough to cause material fatigue failure of the turbomachinery blades unless the flutter is properly damped. The turbomachinery blades are stable (no flutter) when damping is positive. In addition to possible material fatigue failure, problems related to flutter may impose large costs and program delays as they are typically encountered late in development when engines or other turbomachinery are tested at full power or in flight conditions. The operating range of turbomachinery, in terms of pressure rise and flow rate, is restricted by various flutter phenomena. For example, turbomachinery blades that in use substantially operate in the transonic range (referred to hereinafter as "transonic turbomachinery blades"), such as transonic fan blades of transonic fans and compressors, are susceptible to transonic stall flutter, a flutter phenomenon that occurs with partial or complete separation of the flow of working fluid (in this case, airflow) about the transonic turbomachinery blade. Transonic fans and compressors are widely used in gas turbine engines because of their benefits in terms of compactness and reduced weight and cost. The transonic range may be defined as the range of working fluid (usually air) speed in which both subsonic and supersonic flow conditions exist around the transonic turbomachinery blade, and generally refers to an inlet Mach number, or relative inlet Mach number, between about 0.7 and about 1.0. As the transonic flow moves over the transonic turbomachinery blade, the flow is accelerated, becoming locally supersonic. Flowfields comprising supersonic flows, such as transonic flowfields, tend to produce the aero-elastic instability that is evidenced by flutter, including transonic stall flutter. Conventional transonic turbomachinery blades have a zero or near zero camber near the leading edge at cross sections where supersonic flow is expected and camber across the blade at cross sections where the flow is subsonic, near the hub where the rotational velocity is low. Conventional turbomachinery blades that are entirely subsonic will usually have camber across all cross sections from 0% to 100% span.

Hence, there is a need for flutter-resistant transonic turbomachinery blades and methods for reducing transonic turbomachinery blade flutter.

BRIEF SUMMARY

Methods are provided for reducing transonic turbomachinery blade flutter. In accordance with one exemplary embodiment, the method comprises predicting the region of supersonic flow over a transonic turbomachinery blade and inducing a local positive camber to the transonic turbomachinery blade in or proximate the predicted region of supersonic flow. The transonic turbomachinery blade comprises opposite pressure and suction surfaces extending longitudinally in span from a root to an opposite tip, and extending axially in chord between opposite leading and trailing edges.

Flutter-resistant transonic turbomachinery blades are provided in accordance with yet another exemplary embodiment of the present invention. The flutter-resistant transonic turbomachinery blade comprises opposite pressure and suction surfaces extending longitudinally in span from a root to an opposite tip, and extending axially in chord between opposite leading and trailing edges and a local positive camber in or proximate a predicted local region of supersonic flow.

Transonic fans are provided in accordance with yet another exemplary embodiment of the present invention. The transonic fan comprises a hub and a plurality of flutter-resistant transonic fan blades mounted to and forming a circumferential blade array around the hub. The plurality of flutter-resistant transonic fan blades is arranged circumferentially in a row to define corresponding flow passages between adjacent flutter-resistant transonic fan blades for pressurizing a working fluid. Each flutter-resistant transonic fan blade comprises a transonic fan blade having opposite pressure and suction surfaces extending longitudinally in span from a root to an opposite tip and extending axially in chord between opposite leading and trailing edges. A local positive camber is disposed in or proximate a predicted local region of supersonic flow.

Furthermore, other desirable features and characteristics of the flutter-resistant transonic turbomachinery blades and methods for reducing transonic turbomachinery blade flutter will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

Figure 1:
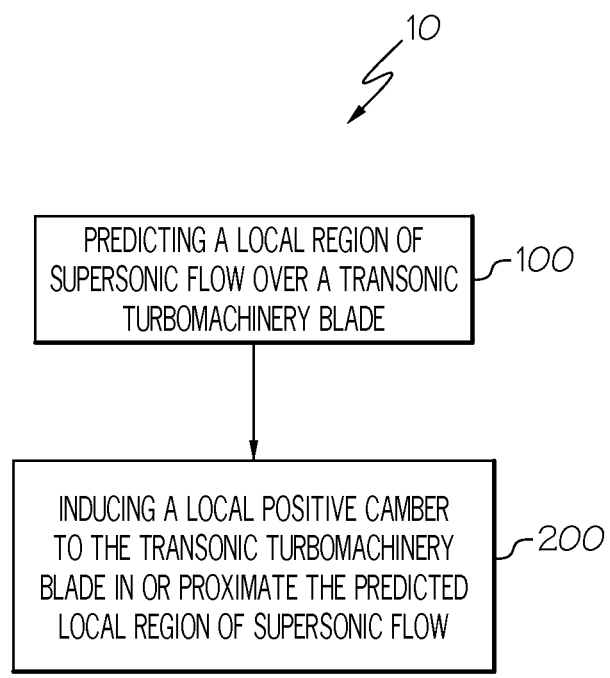
FIG. 1 is a flow diagram of a method for reducing transonic turbomachinery blade flutter, according to exemplary embodiments of the present invention.

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Various embodiments are directed to flutter-resistant transonic turbomachinery blades and methods for reducing transonic turbomachinery blade flutter. As used herein, the term "transonic turbomachinery blade" refers to any type of transonic turbomachinery blade that operates substantially in the transonic range, such as fan blades, propeller blades, compressor blades, turbine blades, etc. For example, the terms "transonic fan" and "transonic fan blade" are used respectively to refer to a fan and fan blade. The term "turbomachinery blade flutter" or simply "flutter" refers to aero-elastic instability of the turbomachinery blade(s) resulting from the interaction of the flow of the working fluid over the blade(s) and the blade(s) natural vibration tendencies. The transonic turbomachinery blades operate substantially in the transonic range and the "transonic turbomachinery blade flutter" is likely to be transonic stall flutter but may be other types of flutter. The term "transonic range" refers to a range of air speed in which both subsonic and supersonic flow conditions exist around the transonic turbomachinery blade, and generally refers to an inlet Mach number, or relative inlet Mach number, between about 0.7 and 1.0. In accordance with exemplary embodiments as described herein, transonic turbomachinery blades that are designed to operate substantially in the transonic range have their cross-sectional areas (i.e., airfoils) designed and/or modified with a local positive camber in a predicted local region of supersonic flow to alleviate flutter (resulting in "flutter-resistant transonic turbomachinery blades"), while reducing weight and thus fuel consumption, without a significant negative impact on efficiency.

Referring to FIGS. 1 through 4, according to exemplary embodiments of the present invention, a method 10 for reducing transonic turbomachinery blade flutter begins by predicting a local region of supersonic flow 30 over a transonic turbomachinery blade 14 (step 100). In one embodiment, the transonic turbomachinery blade may be in the initial design stage. Alternatively, the transonic turbomachinery blade may comprise a conventional transonic turbomachinery blade 14 (e.g., FIGS. 2 through 4) that already exists and is thereafter modified into a flutter-resistant transonic turbomachinery blade 140 (e.g., FIG. 6) as hereinafter described. The transonic turbomachinery blade 14 is one of a plurality of transonic turbomachinery blades arranged in a circumferential blade array (cross-sections of the transonic turbomachinery blades 14 in a circumferential blade array are shown in isolation in FIG. 4) that is attached to or secured to a rotor disc (not shown) or other similar component of a gas turbine engine, or fan or compressor of a turbomachine.

Figure 4:
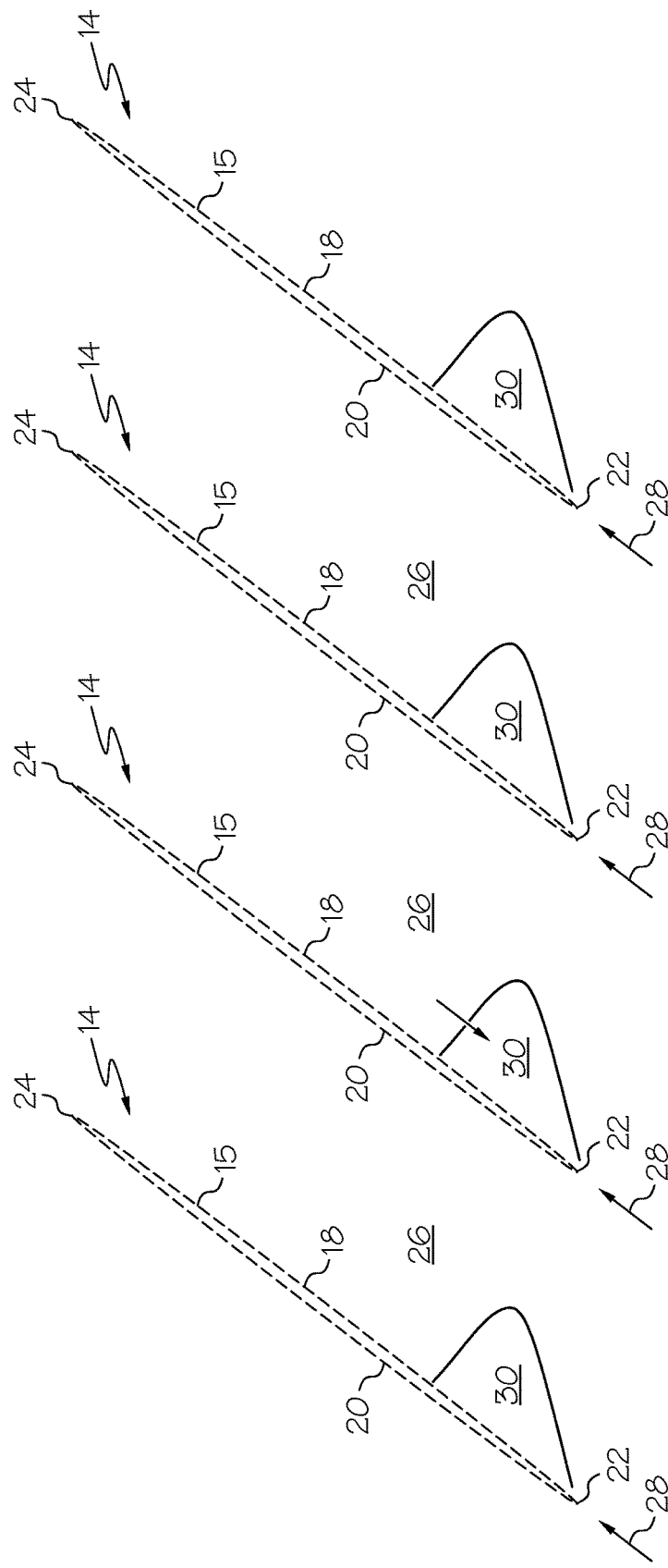
FIG. 4 is a blade-to-blade view of a plurality of conventional transonic turbomachinery blades (e.g., conventional transonic fan blades) in a partial row of a blade array.
Figure 11:
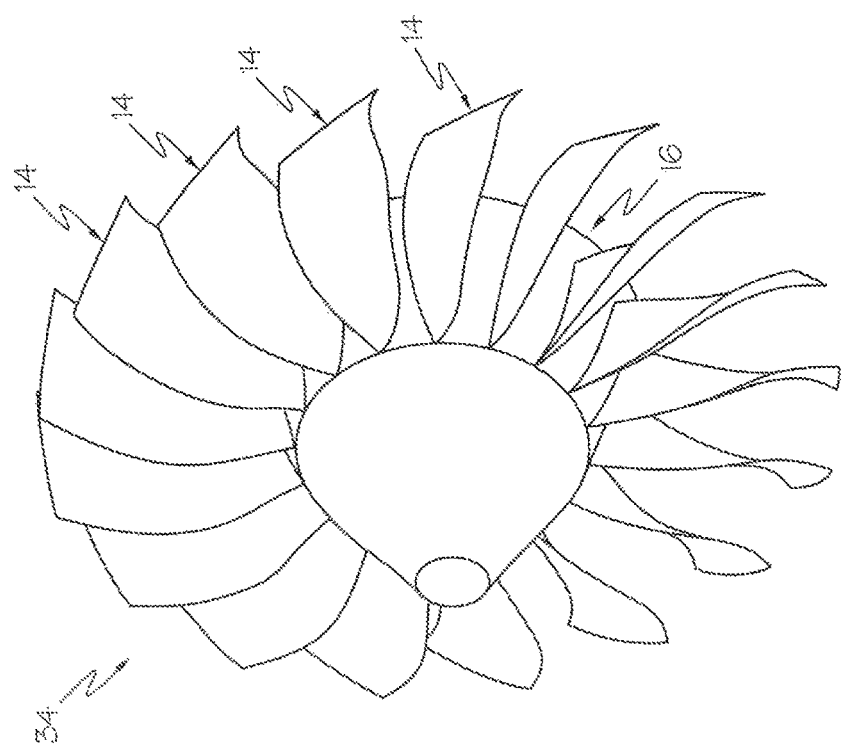
FIG. 11 depicts a conventional transonic fan comprising a plurality of conventional transonic fan blades.

For example, FIG. 4 generally illustrates the blade-to-blade view of the geometric configuration for the cross-section of a conventional transonic fan blade, for example that may be incorporated into a conventional transonic fan 34 (FIG. 11) of a gas turbine engine (not shown). The conventional transonic fan 34 comprises a plurality of the conventional transonic fan blades (conventional transonic turbomachinery blades 14) mounted to and forming the circumferential blade array around a hub. The transonic fan may have a blisk configuration or an inserted blade configuration, as known in the art.

Figure 2:
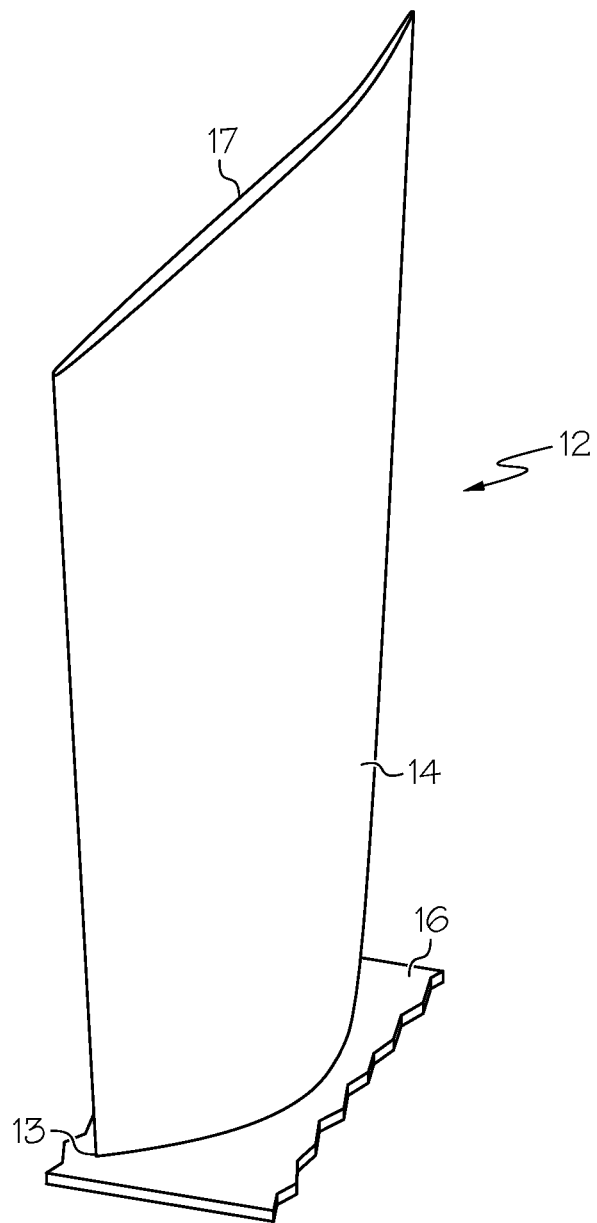
FIG. 2 is a perspective view of an exemplary conventional turbomachinery blade assembly including a conventional transonic fan blade (an exemplary conventional transonic turbomachinery blade)
Figure 3:
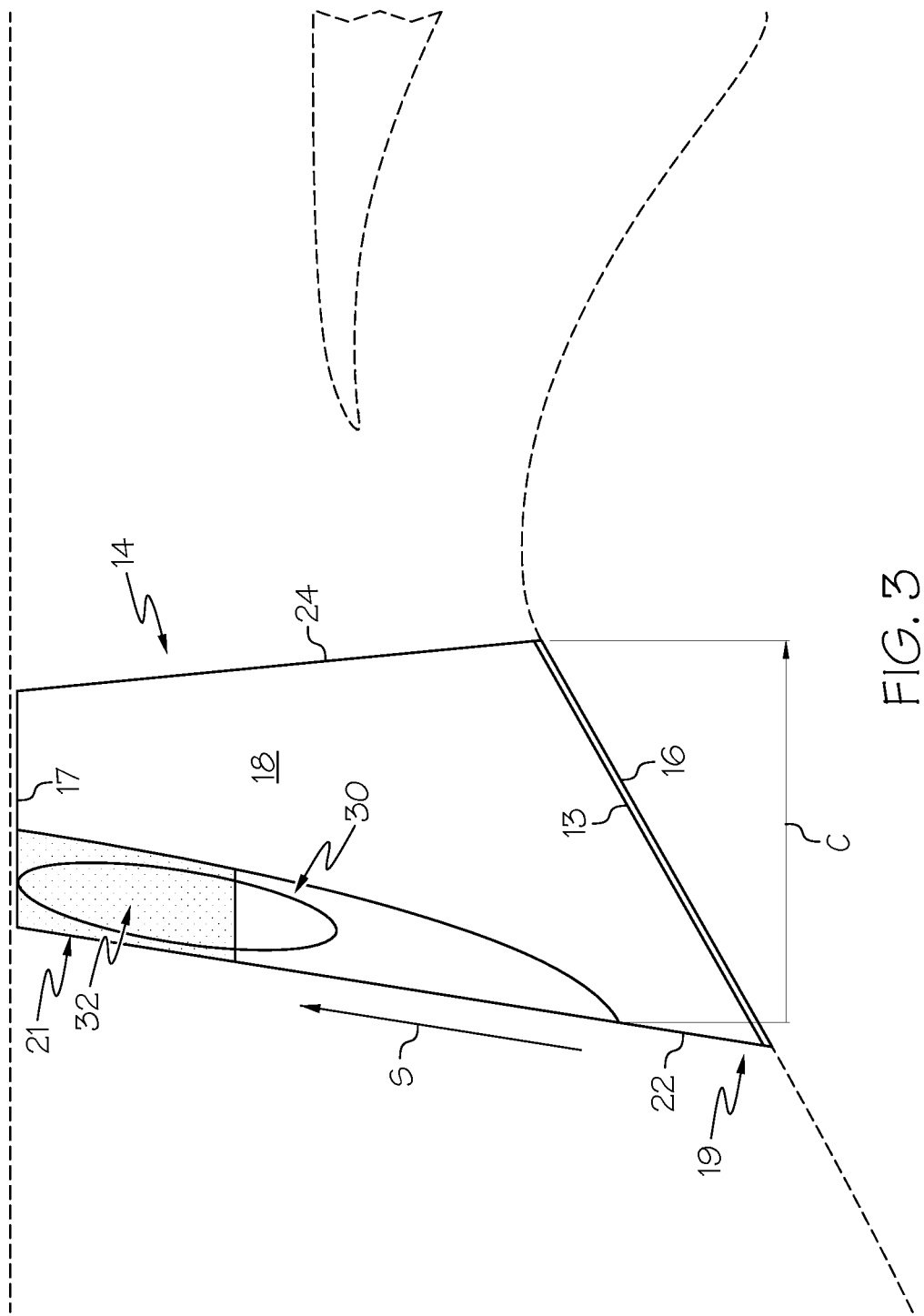
FIG. 3 is an axisymmetric view of the conventional turbomachinery blade assembly of FIG. 2, depicting the conventional transonic fan blade with a predicted region of local supersonic flow to identify the span-wise and chord-wise location for a local positive camber to be induced on the transonic fan blade.

Referring now specifically to FIGS. 2 through 4, the turbomachinery blade assembly 12 is comprised of a conventional transonic turbomachinery blade 14 that extracts energy from a working fluid flow 28 (FIG. 4) and a hub 16 (FIG. 2) that serves to fix the transonic turbomachinery blade 14 to a rotor disk (not shown) or other similar component of a gas turbine engine, or fan or compressor of a turbomachine. The turbomachinery blade assembly 12 (and turbomachinery blade assembly 120 as hereinafter described) may be part of a blisk or an inserted blade assembly. The transonic turbomachinery blade 14 includes a root 13 at an inner, proximal end and a tip 17 at a distal end. The geometry of the transonic turbomachinery blade 14 is defined in part by a span dimension S extending radially from the root 13 to the tip 17, and by a chord dimension C (FIG. 3) that may be defined at any given point along the span and that extends from the leading edge towards the trailing edge at that span, substantially perpendicular to the span dimension S. A chord line D is a straight line connecting the leading and trailing edges of the airfoil (See, e.g., FIG. 9). The span dimension comprises an inner span region 19 and an outer span region 21. An airfoil 15 of the transonic turbomachinery blade 14 is the shape of the transonic turbomachinery blade 14 as seen in cross section at an outer span. The transonic turbomachinery blade 14 includes opposite suction and pressure surfaces 18 and 20 extending longitudinally in span from the root 13 to the opposite tip 17, and extending axially in chord between opposite leading and trailing edges 22 and 24. The leading edge 22 is the point at the front of the transonic turbomachinery blade/airfoil that has maximum curvature. The trailing edge 24 is defined similarly as the point at the rear of the transonic turbomachinery blade/airfoil that has maximum curvature. The suction surface 18 is convex and generally associated with higher velocity and lower static pressure. The pressure surface is concave and has a comparatively higher static pressure than the suction surface. The shape of the airfoil is defined by a mean camber line 23 (FIGS. 7 and 8) that is a line created by a locus of points midway between the upper and lower surfaces of the airfoil measured perpendicular to the chord line. As used herein, the term "camber" refers to the asymmetry between the suction surface and the pressure surface. The camber of an airfoil can be defined by the mean camber line 23. Conventional transonic turbomachinery blades have a zero or near zero camber near the leading edge at cross-sections where supersonic flow is predicted, in transonic or supersonic flow. FIG. 4 is a blade-to blade view of the airfoils of a plurality of conventional transonic turbomachinery blades in a partial row (shown in isolation) of a circumferential blade array. As noted previously, flow passages 26 are defined between adjacent blades 14 for pressurizing the working fluid 28 that enters the flow passages.

In transonic flow, on airfoils of transonic fan blades such as depicted in FIG. 4, the working fluid 28 enters the flow passages between adjacent blades in the direction indicated. The working fluid flows between the blades 14 from the leading edge 22 to the trailing edge 24 and accelerates, becoming locally supersonic over a region of the airfoil (the "predicted local region of supersonic flow 30"). The predicted local region of supersonic flow 30 over each of the airfoils in the blade array depicted in FIG. 4 is on the suction surface 18 near the leading edge 22. It is to be understood that the local region of supersonic flow may be predicted elsewhere on other exemplary transonic turbomachinery blades (not shown) intended to operate substantially in the transonic range.

More particularly, a flowfield will be formed downstream of the leading edge that will have varying characteristics depending on the inlet Mach number, the mass flow through a given stage, and the rotational speed of the turbomachinery blade. Further, the flowfield may vary depending on the radial location on the turbomachinery blade, where locations along the inner span region of the turbomachinery blade may produce a subsonic flowfield, and locations along the outer span region of the turbomachinery blade may produce a supersonic flowfield. Flowfields comprising supersonic flows, such as transonic flowfields, tend to produce aero-elastic instability that is evidenced by transonic stall flutter of the turbomachinery blades in the flutter zone of the turbomachinery blade. The local region of predicted supersonic flow tends to be where the highest loading and damping also occur. The local supersonic flow is terminated on the downstream end by a shockwave oriented almost perpendicular to the flow. Flowfields that create a flutter response in the blades will generally occur within a range of inlet Mach numbers, mass flows, and rotational speeds of the turbomachinery blade, which will generally determine the position at which the shockwave will impinge on the blades. Under transonic conditions, a shockwave may form in approximately the region shown. Upstream of the shockwave, near the leading edge, the local Mach number is greater than 1. Downstream of the shockwave, the local Mach number is less than 1. Shockwaves may cause pressure fluctuations on the surface of the blade that could lead to instability in the blade, such as inducing flutter or other unstable responses. Thus, in the conventional transonic turbomachinery blades of FIGS. 2 through 4, the predicted region of supersonic flow on the suction surface and the separation area behind it are important flutter inducements.

The local region of supersonic flow 30 (FIGS. 3 and 4) over the transonic turbomachinery blade can be predicted using Computational Fluid Dynamics (CFD). The flutter zone for the transonic turbomachinery blade 14 can be predicted using known aero-elastic methods that combine finite element analysis (FEA) and unsteady Computational Fluid Dynamics (CFD). It is to be understood that other methods (e.g., 2D, Inviscid, Linearized) can alternatively or additionally be used to predict the flutter zone for the transonic turbomachinery blade 14. These methods mathematically analyze complex 3D flow streams in turbomachines and can be used to predict the flutter zone and the local region of supersonic flow. The flow analysis can be performed with multiple blade rows/flow passages or using a single flow passage. Suitable exemplary software for use in predicting the flutter zone (and thus turbomachinery blade flutter) includes Turbo-AE software developed by the National Aeronautics and Space Administration (NASA), among others. Turbo-AE is a 3D Navier-Stokes viscous solver which performs a time-accurate unsteady simulation with blade motion, and uses the work per cycle method to calculate aerodynamic damping. The flutter zone is the portion of the operating range where negative aerodynamic damping is predicted. If the net aerodynamic work done on the blade is positive, then work is being imparted on the blade thus creating negative aerodynamic damping, a potentially unstable situation leading to self-sustained vibration (flutter). On the other hand, if the aerodynamic work done on the blade is negative, the blade motion is doing work on the fluid and leads to a stable or damped vibration. The blade is stable when there is no flutter. However, this does not mean that the aerodynamic damping must be exactly zero. A small amount of negative aerodynamic damping may be acceptable because some mechanical damping can be expected. Total damping includes aerodynamic damping and mechanical damping. However, the amount of mechanical damping is not predicted by an aero-elastic analysis. The amount of mechanic damping may be estimated to be about 0.2 for inserted blade geometry and is smaller for a blisk geometry. So, for a blisk transonic fan, the aerodynamic damping should be nearly zero for the blade to be stable, while for an inserted blade transonic fan, the aerodynamic damping can be slightly negative. If the expected positive mechanical damping for the inserted blade configuration is high enough to overcome the negative value for aerodynamic damping, the transonic fan will be stable.

Figure 5:
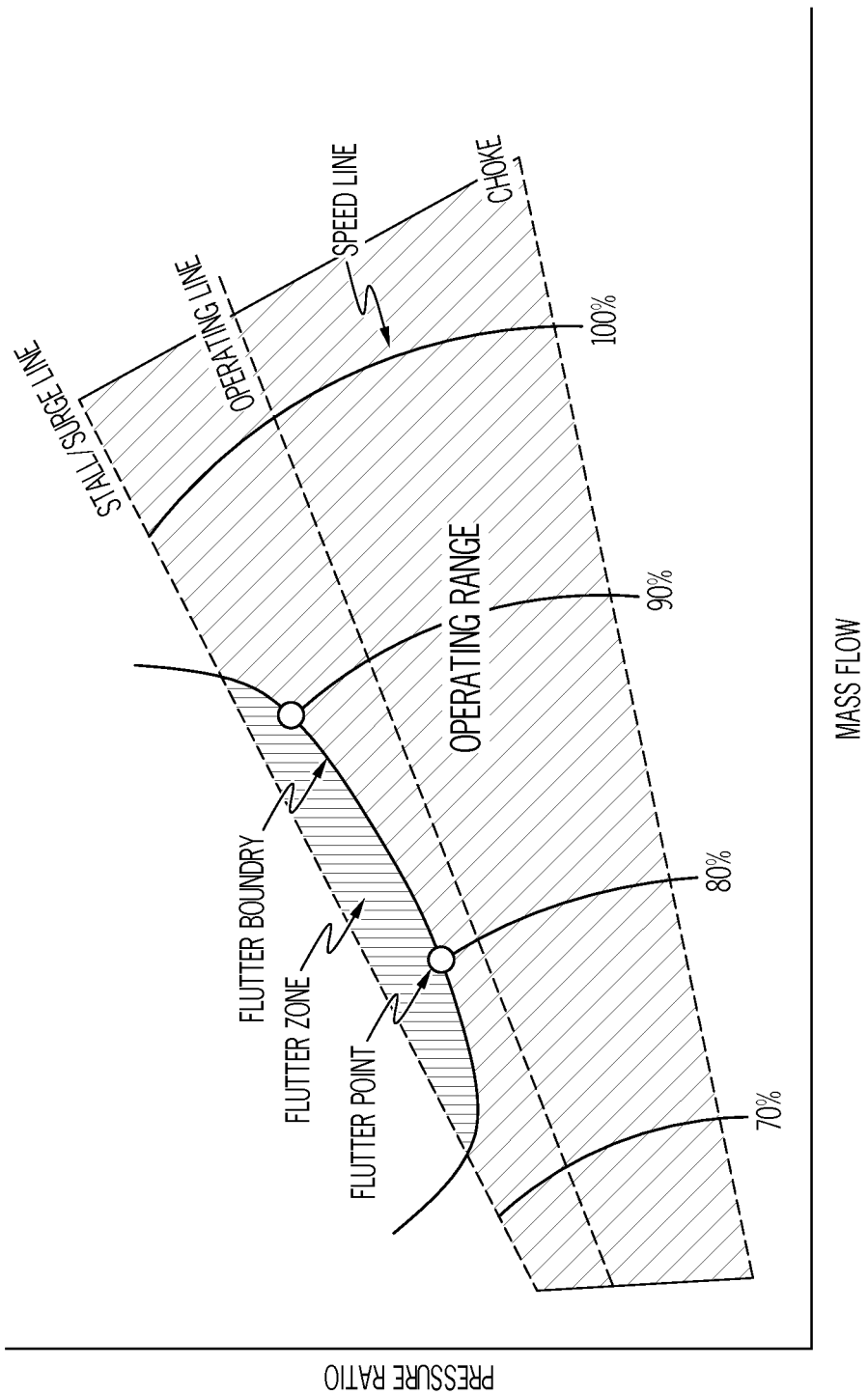
FIG. 5 is a conventional transonic fan or compressor performance map with predicted transonic stall flutter at 80% and 90% speeds.

FIG. 5 is an example of a performance map for a transonic fan 34 (FIG. 11) or compressor utilizing the conventional transonic turbomachinery blades of FIGS. 2 through 4. Performance maps show the total pressure ratios plotted as a function of corrected flow rate at different corrected rotational speeds for a stage (in this case the stage being shown is the fan stage). For a given corrected rotational speed (100% speed for example), the speed line is a distinct line of data that defines the relationship between the total pressure ratio and the corrected flow rate at that speed. The speed lines are calculated using a CFD analysis, and the flutter point is calculated using an aeroelastic analysis. The performance maps that are predicted using CFD are compared with performance maps generated by a test rig. The stall/surge line indicates a region of unstable flow. Stable operation occurs below the surge line. Therefore, the operating region is below the surge line, but above the choke line. The choke line is the lower boundary of the performance map. Below the choke line, the efficiency drops. The operating region for the transonic fan 34 or compressor is between the choke and stall/surge lines.

Within the CFD analysis, the speed line is calculated by running an analysis for a variety of pressure ratios, and calculating the resulting mass flow. The line is created by plotting several of these points at a given speed. For each of these points, the aerodynamic damping is also calculated. The flutter point is where aerodynamic damping is predicted to cross from positive to negative—beyond this point the part will be unstable. The flutter point is calculated by doing a linear interpolation or extrapolation of aerodynamic damping and corrected mass flow, given the points calculated directly within the CFD code. Operation of the transonic fan 34 or compressor within the flutter zone results in energy transfer to the blade from the flow around the blade (net aerodynamic work), making some conventional transonic turbomachinery blades 14 predicted to be unstable with flutter at 80% and 90% speeds such as shown by a flutter boundary line in FIG. 5. The flutter boundary is at the edge of the flutter zone, where aerodynamic damping is exactly zero.

Referring again to FIG. 1 and now to FIGS. 6 through 9, according to exemplary embodiments of the present invention, method 10 for reducing transonic turbomachinery blade flutter continues by inducing a local positive camber 32 to the transonic turbomachinery blade 14 in or proximate the predicted local region of supersonic flow 30, resulting in a transonic turbomachinery blade that is predicted to be flutter-resistant (hereinafter, a "flutter-resistant transonic turbomachinery blade" 140 (e.g., FIG. 6)) (step 200). The flutter resistance of the flutter-resistant transonic turbomachinery blade may be verified in a test rig, i.e., the designed flutter-resistant transonic turbomachinery blade 140 may be built and then tested in an engine test rig to verify its predicted flutter resistance by comparing the predicted flutter resistance with that measured through engine rig tests. Verification in test helps reduce costs and program delays. Flutter resistance may also be verified using an aeroelastic analysis, as described above.

Figure 6:
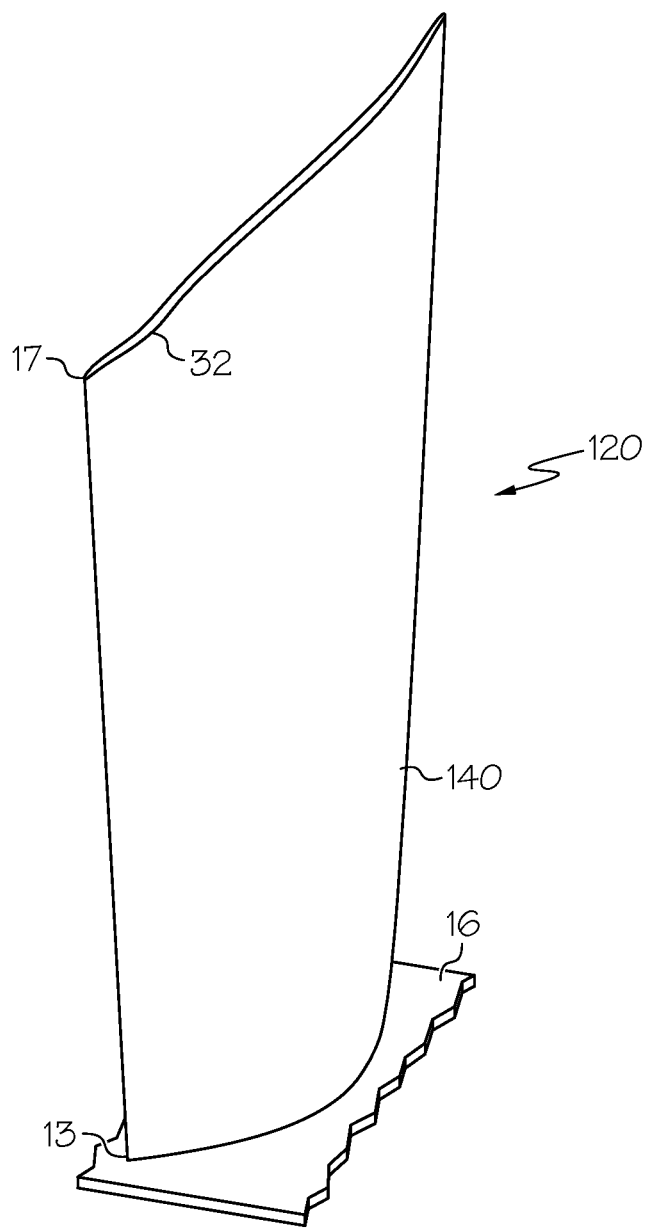
FIG. 6 is a perspective view of a turbomachinery blade assembly including an exemplary flutter-resistant transonic turbomachinery blade (e.g., a flutter-resistant transonic fan blade), according to exemplary embodiments of the present invention.

The flutter-resistant transonic turbomachinery blade 140 is depicted in exemplary turbomachinery blade assembly 120 (FIG. 6). Like turbomachinery blade assembly 12, turbomachinery blade assembly 120 may be part of a blisk or an inserted blade assembly. Flutter-resistant transonic turbomachinery blade 140 has the same geometry as the transonic turbomachinery blade 14, with the exception of the local positive camber 32 as depicted in FIG. 6. As noted previously, "camber" is the asymmetry between the suction surface 18 and the pressure surface 20. A "local positive camber" refers to a convex rise of the airfoil from the chord line along a local portion of the chord line. To alleviate flutter, the local positive camber is induced on the suction surface in or proximate the predicted local region of supersonic flow. Depending on other design considerations, the local positive camber may additionally be induced on the pressure surface, but local positive camber of the pressure surface has a negligible effect on flutter. Therefore, the pressure surface can be unmodified (i.e., no local positive camber) as in FIG. 7 or modified (to include the local positive camber) along with the suction surface as in FIG. 8 and the impact on flutter will be nearly the same.

Figure 7:
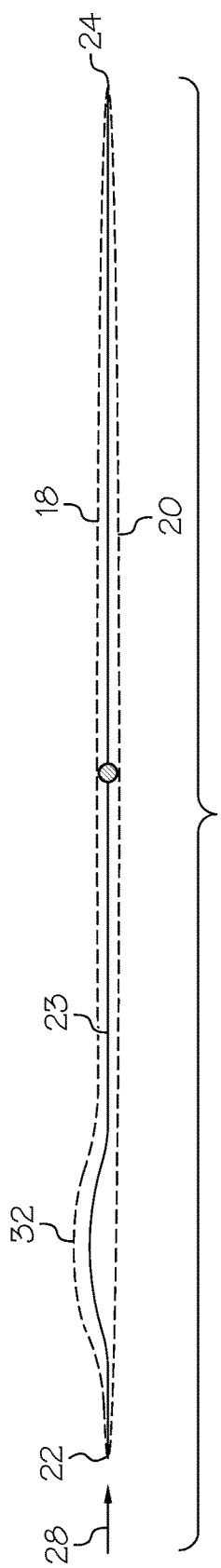
FIG. 7 is a cross-sectional view of an exemplary flutter-resistant transonic turbomachinery blade (e.g., a flutter-resistant transonic fan blade) with a local positive camber of the suction surface near the leading edge, according to another exemplary embodiment of the present invention.
Figure 8:
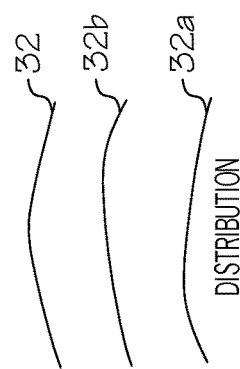
FIG. 8 is a cross-sectional view of an exemplary flutter-resistant transonic turbomachinery blade (e.g., a flutter-resistant transonic fan blade) with a local positive camber of the suction and pressure surfaces near the leading edge, according to yet other exemplary embodiments of the present invention (with the optimization parameters identified)
Figure 8:
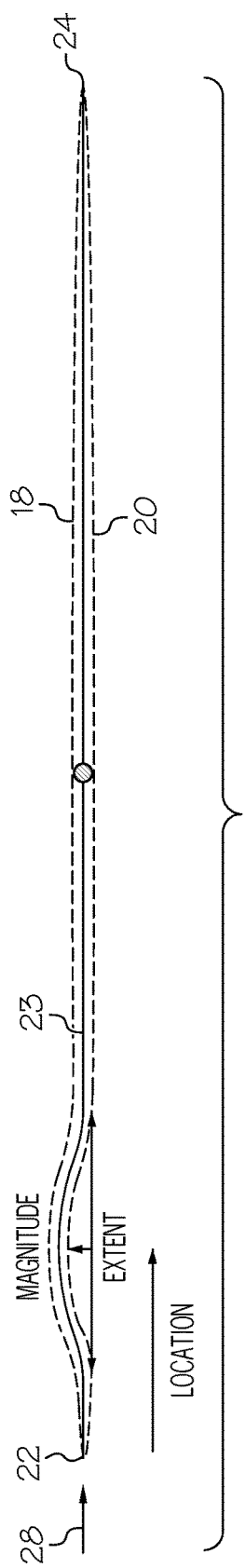
Figure 9:
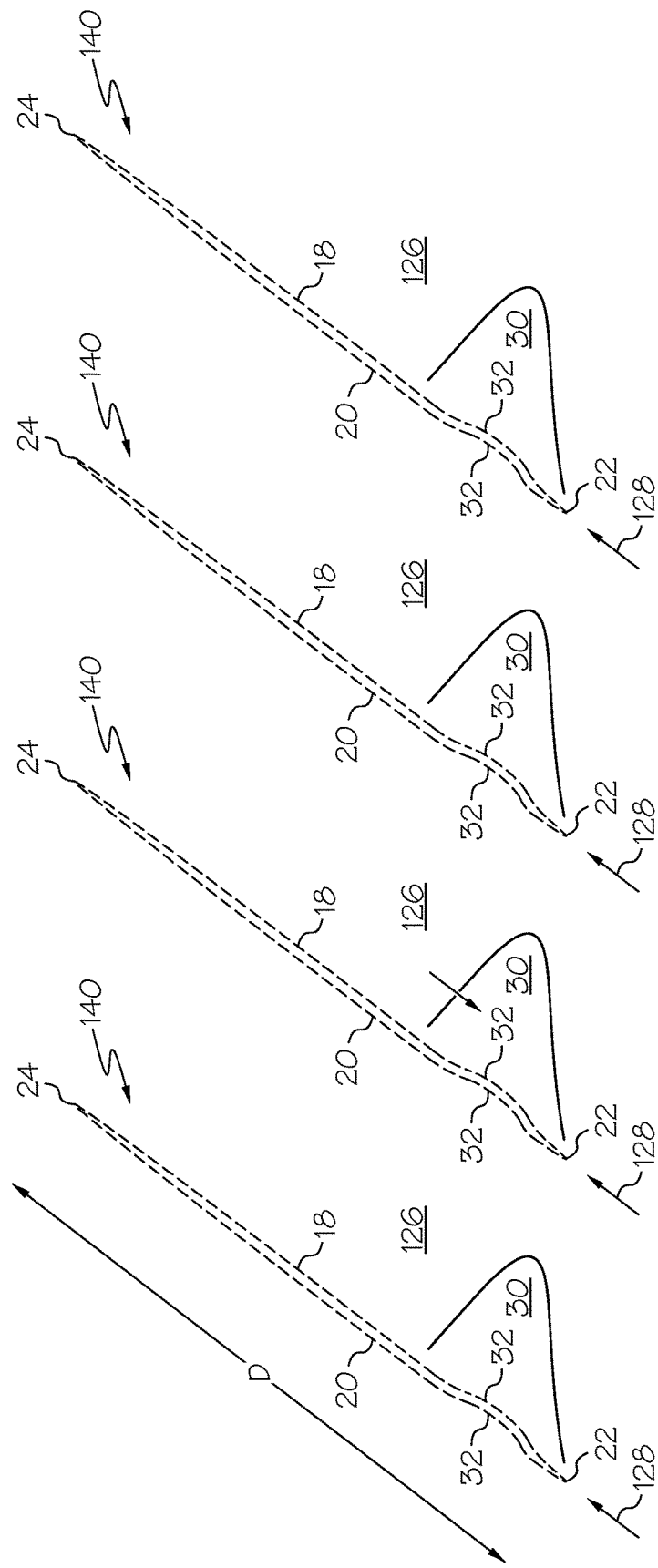
FIG. 9 is a blade-to-blade view of a plurality of flutter-resistant transonic turbomachinery blades (e.g., flutter-resistant transonic fan blades) in a partial row of a modified blade array.

More particularly, the flutter-resistant transonic turbomachinery blade 140 with an airfoil cross-section depicted in FIG. 7 has the local positive camber 32 on the suction surface near the leading edge (i.e., in or proximate the local region of supersonic flow 30 predicted in step 100) while the airfoil(s) depicted in FIG. 8 or in the blade array of FIG. 9 have a local positive camber on the suction surface and on the pressure surface. As supersonic flowfields will generally occur at outer span portions of the transonic turbomachinery blades (and extending toward the blade tip) as noted above, the local positive camber may be defined, in an embodiment, starting at about 60% of the span length, where it blends with the airfoil profile, and continues to 100% of the span dimension, where it also blends with the airfoil profile. The local positive camber 32 is induced at a chordwise location located forward of or proximate the shock location. The local positive camber may comprise about 10 to about 50% of the chord dimension. The maximum positive camber as hereinafter described occurs at about 5 to about 25% of the total chord dimension. The local positive camber may be bow-shaped or may have other shapes.

The local positive camber may be characterized by a chord location, a chord extent, a magnitude, and a distribution as depicted in FIG. 8. Aero-elastic analysis and different modeling tools as known to one skilled in the art may be used to optimize the chord location, the chord extent, the magnitude, and the distribution (collectively, the "optimization parameters") of the local positive camber to improve flutter resistance of the flutter-resistant turbomachinery blade. The chord location refers to the location of the local positive camber along the chord line. The chord extent refers to how far the local positive camber extends along the chord line between the leading edge and the trailing edge. The magnitude represents the distance between the suction surface and the chord line. The location of maximum camber may be at the midpoint of the local positive camber, or at other locations along the chord where the local positive camber is induced. The distribution refers to the maximum camber location that defines the shape of the local positive camber. For example, as noted above, FIG. 8 depicts a bow-shaped camber 32 with the maximum camber location substantially midpoint of the camber. FIG. 8 also depicts, in isolation, two alternative exemplary distributions for the local positive camber. For example, the maximum camber location of local positive camber 32a is closer to a forward end of the local positive camber, while the maximum camber location of local positive camber 32b is closer to an aft end. While exemplary distributions are depicted, it is to be understood that the distribution of the local positive camber may be other than that depicted.

While the flutter-resistant transonic turbomachinery blades 140 in the blade array of FIG. 9 are depicted as having substantially the same local positive camber, i.e., the local positive camber of each flutter-resistant transonic turbomachinery blade in the blade array is of substantially the same magnitude, distribution, extent, and location (there may be some blade-to-blade variation due to in-service wear and/or manufacturing tolerances), it is to be understood that the local positive camber 32 may vary between two or more of the flutter-resistant transonic turbomachinery blades in the blade array, i.e., one or more of the flutter-resistant transonic turbomachinery blades may have a different local positive camber from the local positive camber of another blade in the blade array, i.e., the local positive cambers may be of a different magnitude, have a different distribution, a different extent, at a different location, or combinations thereof.

Figure 10:
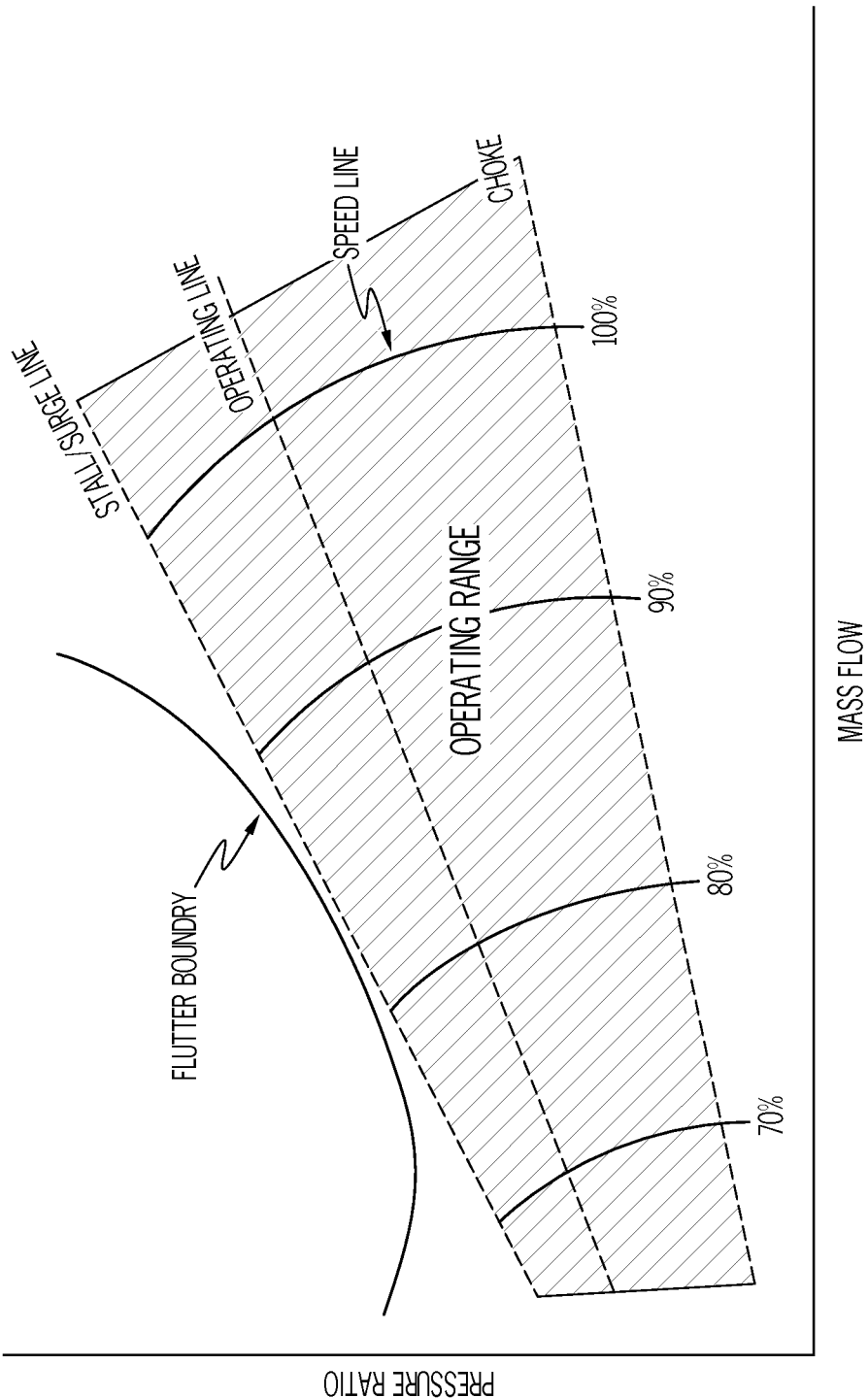
FIG. 10 is a performance map for a flutter-resistant transonic turbomachinery blade with predicted transonic stall flutter mitigated across all speeds, the extrapolated flutter boundary moved partly or entirely out of the operating range.
Figure 12:
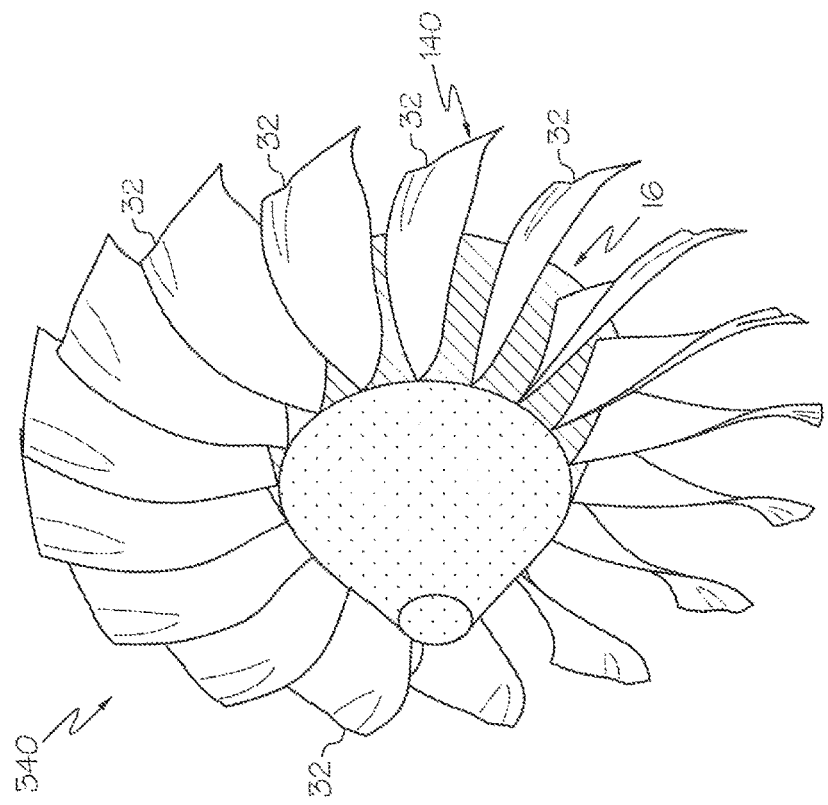
FIG. 12 depicts a transonic fan comprising a plurality of flutter-resistant transonic fan blades, according to yet another exemplary embodiment of the present invention.

Therefore, it would be predicted from known blade flutter prediction methods (e.g., aero-elastic analysis or a rig test) that transonic turbomachinery blade flutter would be substantially mitigated in the turbomachine (e.g., transonic fan 340 (FIG. 12) or compressor (not shown)) in which the flutter-resistant transonic turbomachinery blade 140 of FIG. 6 is to be used. Transonic fan 340 (FIG. 12) according to exemplary embodiments comprises a plurality of the transonic fan blades (flutter-resistant transonic turbomachinery blades 140) mounted to and forming the circumferential blade array around the hub 16. FIG. 10 is an operating map showing the performance characteristics of the transonic fan or compressor utilizing the flutter-resistant transonic turbomachinery blades. To reduce transonic turbomachinery blade flutter, the flutter zone must be wholly or in part removed from the operating range (e.g., FIG. 10) as hereinafter described. Total damping will be positive within the operating range, thereby stabilizing the blades against transonic stall flutter, thereby moving the flutter boundary wholly or in part out of the operating range as shown by the position of flutter boundary line of FIG. 10. The flutter zone is depicted as removed entirely from the operating range. The flutter-resistant transonic turbomachinery blades thereby represent blades that, when built, will have improved transonic stall flutter characteristics. Although the flutter-resistant transonic turbomachinery blades depicted in FIG. 12 are depicted as transonic fan blades of a transonic fan, as noted previously, the exemplary embodiments discussed herein are applicable to any type of transonic turbomachinery blade that operates substantially in the transonic range, such as compressor blades, propeller blades, turbine blades, etc.

From the foregoing, it is to be appreciated that the presently described flutter-resistant transonic turbomachinery blades having a local positive camber in or proximate the predicted local region of supersonic flow and the methods for reducing transonic turbomachinery blade flutter operate to provide an overall reduction in the flutter response of the blades, while reducing weight and thus fuel consumption, without a significant negative impact on efficiency.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A flutter-resistant transonic turbomachinery blade comprising:
   a transonic turbomachinery blade comprising opposite pressure and suction surfaces extending longitudinally in span from a root to an opposite tip, and extending axially in chord between opposite leading and trailing edges, with a chord line connecting the leading and the trailing edges; and
   a local positive camber in or proximate a predicted local region of supersonic flow over the transonic turbomachinery blade, the local positive camber comprising a convex rise of the suction surface from the chord line along a local portion of the chord line that is spaced apart from the leading edge, the local positive camber having a location of maximum positive camber that is offset from a midpoint of the local positive camber.

2. The flutter-resistant transonic turbomachinery blade of claim 1, wherein the local positive camber is near the leading edge on the suction and pressure surfaces of the transonic turbomachinery blade.

3. The flutter-resistant transonic turbomachinery blade of claim 1, wherein the local positive camber comprises about 10 to about 50% of a chord dimension and the maximum positive camber occurs at about 5 to about 25% of a total chord dimension.

4. The flutter-resistant transonic turbomachinery blade of claim 1, wherein the local positive camber has a magnitude, and a chord extent.

5. The flutter-resistant transonic turbomachinery blade of claim 1, wherein the local positive camber begins at an outer span region and extends toward the tip of the transonic turbomachinery blade.

6. The flutter-resistant transonic turbomachinery blade of claim 1, wherein the flutter-resistant transonic turbomachinery blade comprises a flutter-resistant transonic fan blade.

7. A transonic fan comprising:
   a hub; and
   a plurality of flutter-resistant transonic fan blades mounted to and forming a circumferential array around the hub and arranged circumferentially in a row to define corresponding flow passages between adjacent flutter-resistant transonic fan blades for pressurizing a working fluid, each flutter-resistant transonic fan blade comprising:
      a transonic fan blade that includes opposite pressure and suction surfaces extending longitudinally in span from a root to an opposite tip and extending axially in chord between opposite leading and trailing edges, with a chord line connecting the leading and the trailing edges; and
      a local positive camber in or proximate a predicted local region of supersonic flow over the transonic fan blade, the local positive camber comprising a convex rise of the suction surface from the chord line along a local portion of the chord line that is spaced apart from the leading edge, the local positive camber having a location of maximum positive camber that is offset from a midpoint of the local positive camber.

8. The transonic fan of claim 7, wherein the local positive camber is near the leading edge on the suction and pressure surfaces of the transonic fan blade.

9. The transonic fan of claim 7, wherein the local positive camber comprises about 10 to about 50% of a chord dimension and the maximum positive camber occurs at about 5 to about 25% of a total chord dimension.

10. The transonic fan of claim 7, wherein the local positive camber has a magnitude, and a chord extent.

11. The transonic fan of claim 7, wherein the local positive camber begins at an outer span region and extends toward the tip of the transonic fan blade.

12. The transonic fan of claim 7, wherein the location of maximum positive camber is offset from the midpoint toward an aft end of the local positive camber.

13. The transonic fan of claim 7, wherein the location of maximum positive camber is offset from the midpoint toward a forward end of the local positive camber.

* * * * *